(12) United States Patent
Suh

(10) Patent No.: US 9,838,067 B2
(45) Date of Patent: Dec. 5, 2017

(54) ELECTRONIC DEVICE WITH PIFA TYPE ANTENNA AND WIRELESS SIGNAL TRANSMITTING/RECEIVING DEVICE THEREOF

(71) Applicant: Samsung Electronics Co., Ltd., Suwon-si, Gyeonggi-do (KR)

(72) Inventor: Younghoon Suh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/908,406

(22) PCT Filed: Sep. 26, 2014

(86) PCT No.: PCT/KR2014/008998
§ 371 (c)(1),
(2) Date: Jan. 28, 2016

(87) PCT Pub. No.: WO2015/046937
PCT Pub. Date: Apr. 2, 2015

(65) Prior Publication Data
US 2016/0164180 A1    Jun. 9, 2016

(30) Foreign Application Priority Data

Sep. 30, 2013 (KR) .................. 10-2013-0116971
Oct. 14, 2013 (KR) .................. 10-2013-0122254

(51) Int. Cl.
*H04B 1/44*    (2006.01)
*H01Q 1/24*    (2006.01)
(Continued)

(52) U.S. Cl.
CPC .............. *H04B 1/44* (2013.01); *H01Q 1/243* (2013.01); *H01Q 9/0421* (2013.01); *H01Q 9/42* (2013.01)

(58) Field of Classification Search
CPC ........ H04B 1/44; H01Q 9/0421; H01Q 1/243; H01Q 9/42
See application file for complete search history.

(56) References Cited

U.S. PATENT DOCUMENTS 6,255,994 B1    7/2001  Saito
6,414,641 B1    7/2002  Carlson et al.
(Continued)

FOREIGN PATENT DOCUMENTS

KR    10-2002-0042731 A    6/2002
KR    10-2004-0083475 A    10/2004
(Continued)

*Primary Examiner* — Andrew Wendell
*Assistant Examiner* — Maryam Soltanzadeh
(74) *Attorney, Agent, or Firm* — Jefferson IP Law, LLP

(57) ABSTRACT

Various exemplary embodiments of the present disclosure relate to an electronic device with a Planar Inverted-F Antenna (PIFA) type antenna and a wireless signal transmitting/receiving device of the electronic device. The electronic device may include: a PIFA (Planar Inverted-F Antenna) type antenna which is transmitting or receiving a wireless signal; a wireless communication unit which is processing the transmitted or received wireless signal; a printed circuit board which is mounted with the wireless communication unit and includes a ground area; a power feeding pad which is electrically connected with a signal transmitting/receiving terminal of the wireless communication unit, and connected with a power feeding section of the PIFA type antenna when the PIFA type antenna is equipped in the electronic device; a ground pad which is electrically connected with the ground area, and connected with a ground section of the PIFA type antenna when the PIFA type antenna is equipped in the electronic device; and a connection section which forms an electric route between the power feeding pad and the ground pad. Meanwhile, various exem- (Continued)

plary embodiments may be made based on a technical idea of the present disclosure.

12 Claims, 4 Drawing Sheets

(51) Int. Cl.
*H01Q 9/42* (2006.01)
*H01Q 9/04* (2006.01)

(56) References Cited

U.S. PATENT DOCUMENTS

| | | | | |
|---|---|---|---|---|
| 6,639,560 | B1* | 10/2003 | Sullivan | H01Q 1/243 343/700 MS |
| 7,102,575 | B2* | 9/2006 | Pan | H01Q 1/243 343/700 MS |
| 7,180,448 | B2* | 2/2007 | Suganthan | H01Q 1/243 343/700 MS |
| 2003/0164798 | A1 | 9/2003 | Nevermann | |
| 2005/0024271 | A1* | 2/2005 | Ying | H01Q 1/243 343/702 |
| 2005/0062655 | A1* | 3/2005 | Suganthan | H01Q 1/243 343/702 |
| 2005/0159195 | A1* | 7/2005 | Huber | H01Q 1/243 455/575.5 |
| 2008/0007469 | A1 | 1/2008 | Hung et al. | |
| 2009/0262028 | A1* | 10/2009 | Mumbru | H01Q 5/371 343/702 |
| 2010/0026580 | A1 | 2/2010 | Tang | |
| 2011/0037665 | A1* | 2/2011 | Ahn | H01Q 9/42 343/702 |
| 2011/0273358 | A1* | 11/2011 | Koyama | H01Q 1/24 343/876 |
| 2013/0234897 | A1 | 9/2013 | Yoon | |

FOREIGN PATENT DOCUMENTS

| | | |
|---|---|---|
| KR | 10-2007-0098020 A | 10/2007 |
| KR | 10-2008-0058736 A | 6/2008 |

* cited by examiner

[Fig. 1]
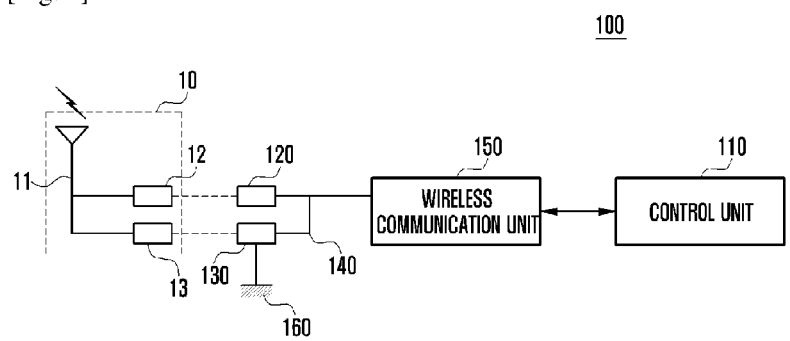
[Fig. 2]
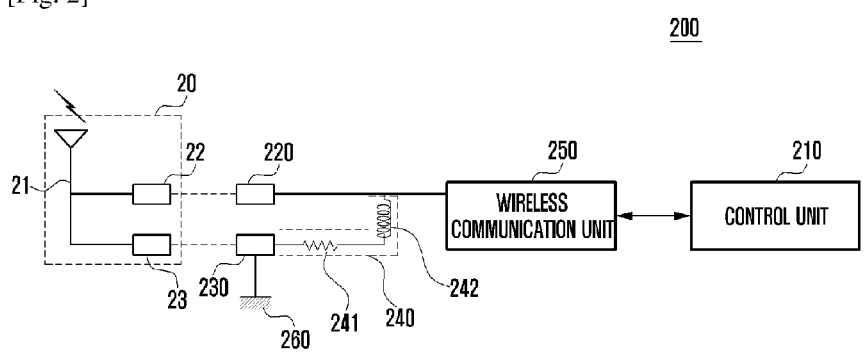
[Fig. 3]
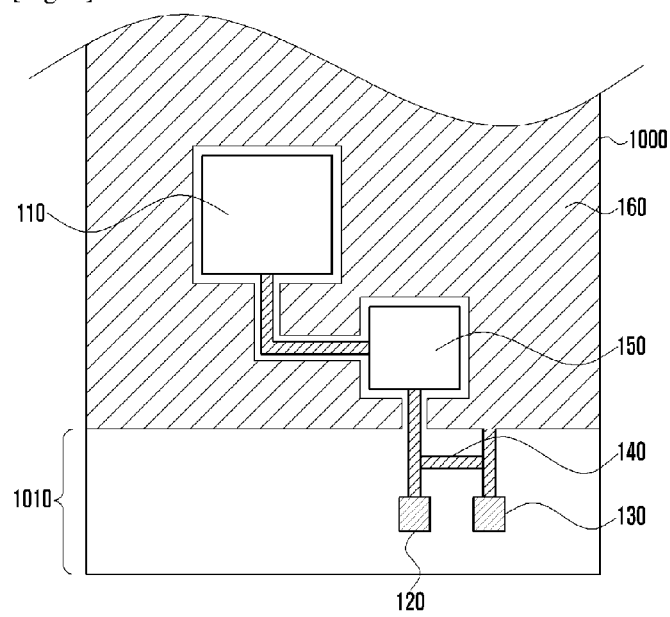
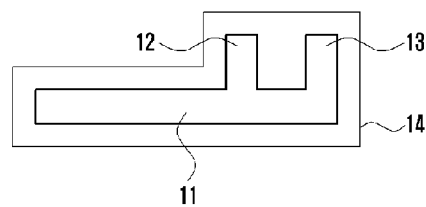

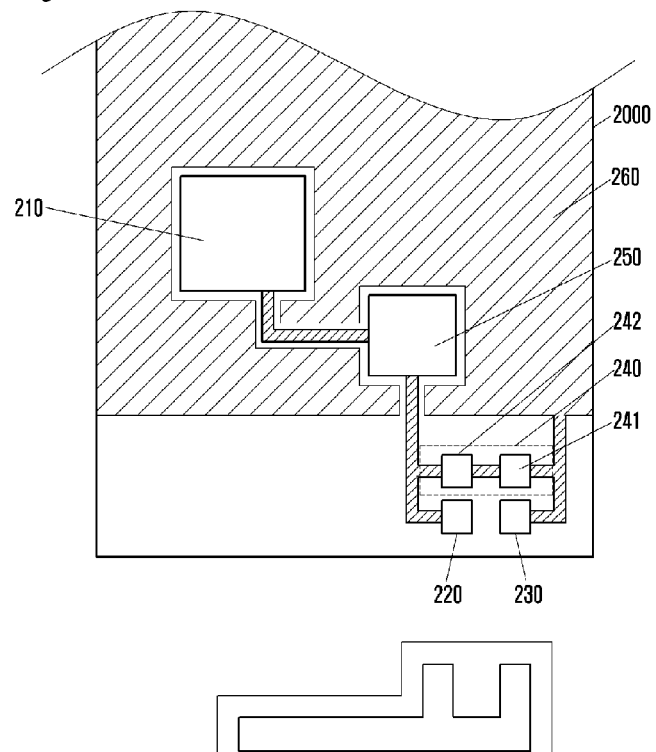
[Fig. 4]
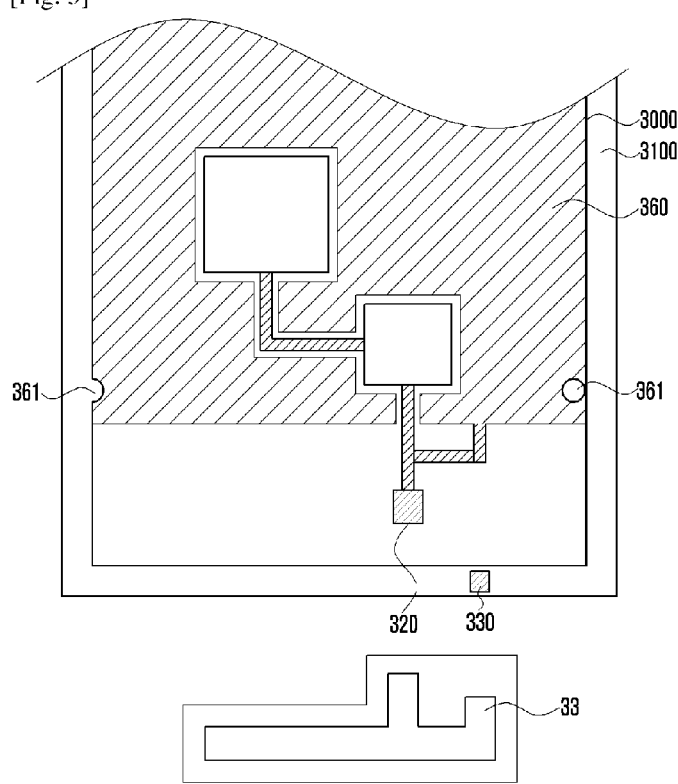
[Fig. 5]

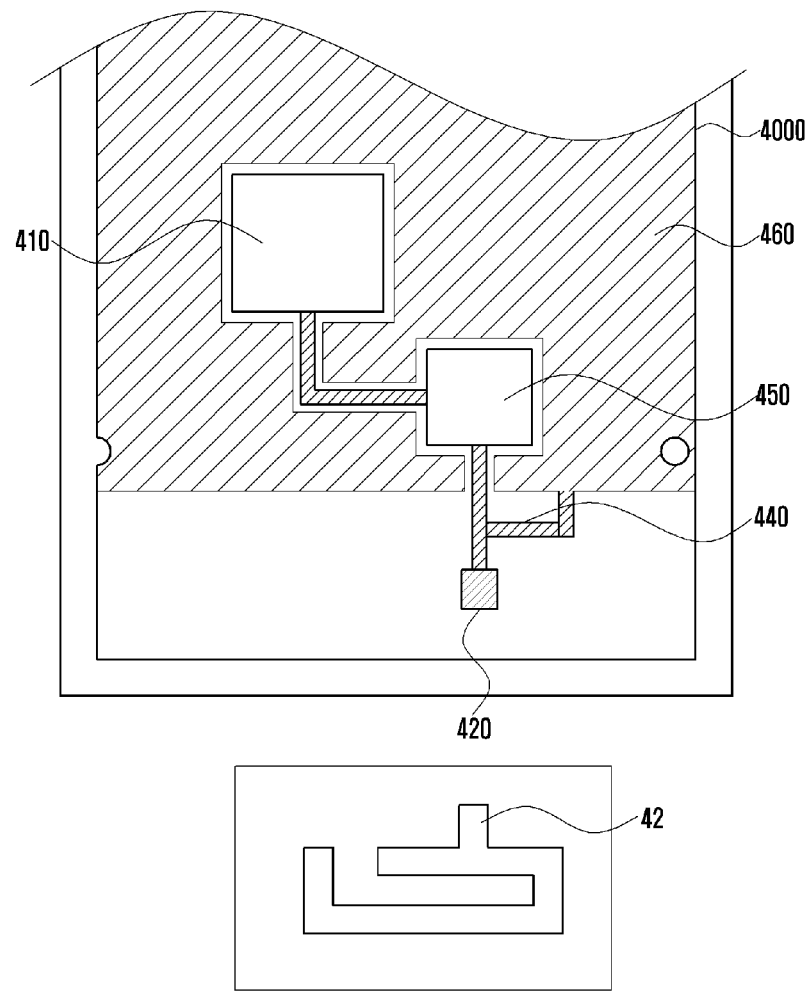
[Fig. 6]

[Fig. 7]
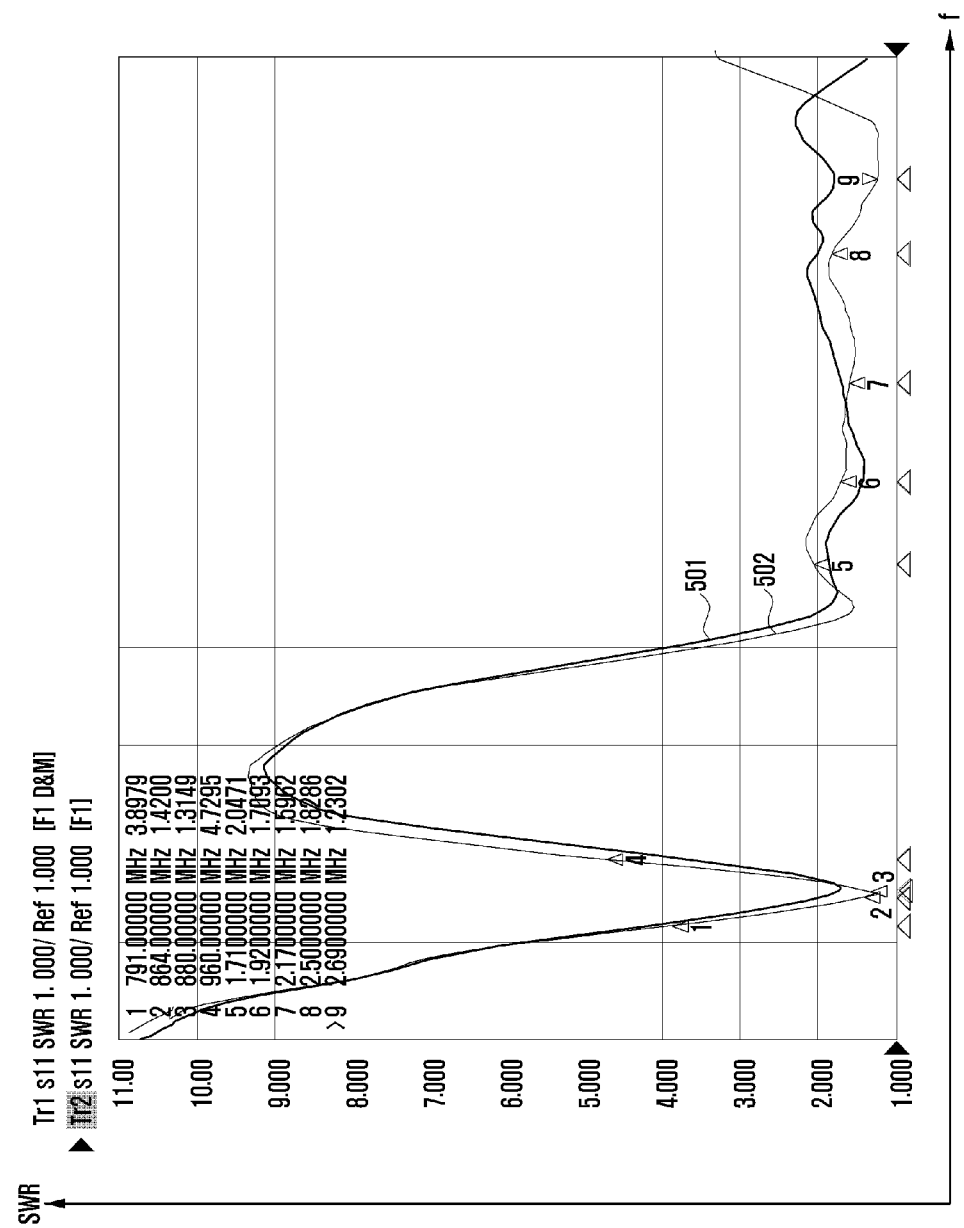

ELECTRONIC DEVICE WITH PIFA TYPE ANTENNA AND WIRELESS SIGNAL TRANSMITTING/RECEIVING DEVICE THEREOF

TECHNICAL FIELD

Various exemplary embodiments of the present disclosure relate to an electronic device with a Planar Inverted-F Antenna (PIFA) type antenna and a wireless signal transmitting/receiving device thereof.

BACKGROUND ART

Recently, remarkable development of information communication technology, semi-conductor technology and the like have rapidly increased distribution and use of electronic devices. In addition, recent electronic devices are a convergence of various types of terminals rather than being strictly for one type of use. For example, a mobile communication terminal provides various functions, such as a function for TV watching (e.g., mobile broadcasting such as a Digital Multimedia Broadcasting (DMB) or Digital Video Broadcasting (DVB), a music reproducing function (e.g., MPEG Audio Layer-3 (MP3), a still image or moving image photographing function, an Internet connection function, and a radio receiving function, in addition to an ordinary communication function such as a voice communication function or a message transmitting/receiving function.

DISCLOSURE OF INVENTION

Technical Problem

Meanwhile, the electronic devices include an antenna for a wireless communication function. The electronic devices generally use a PIFA type antenna. The PIFA type antenna has a problem in that it is difficult to secure a radiation efficiency and a radiation performance when an effective volume is small. Conventionally, the PIFA type antenna has been manufactured to have a large size in order to increase the effective volume of the antenna.

Recent slimmed electronic devices suffer from a difficulty in securing a space for mounting an antenna. For example, the recent electronic devices have a problem in that it is difficult to secure an effective volume for an antenna.

Solution to Problem

Various exemplary embodiments of the present disclosure have been made in an effort to solve the above-described problems in the related art and is capable of providing an electronic device with a PIFA type antenna and a wireless signal transmitting/receiving device thereof which are capable of securing a radiation performance of the electronic device without increasing an effective volume of the PIFA type antenna.

In order to solve the problems or inconveniences as described above, there is provided an electronic device with a PIFA type antenna according to an aspect of the present disclosure. The electronic device may include: a PIFA (Planar Inverted-F Antenna) type antenna which is transmitting or receiving a wireless signal; a wireless communication unit which is processing the transmitted or received wireless signal; a printed circuit board which is mounted with the wireless communication unit and includes a ground area; a power feeding pad which is electrically connected with a signal transmitting/receiving terminal of the wireless communication unit, and connected with a power feeding section of the PIFA type antenna when the PIFA type antenna is equipped in the electronic device; a ground pad which is electrically connected with the ground area, and connected with a ground section of the PIFA type antenna when the PIFA type antenna is equipped in the electronic device; and a connection section which forms an electric route between the power feeding pad and the ground pad.

In order to solve the above-described problems or inconveniences, there is provided an electronic device with a PIFA type antenna. The electronic device may include: a PIFA (Planar Inverted-F Antenna) type antenna which is transmitting or receiving a wireless signal; a wireless communication unit which is processing the transmitted or received wireless signal; a printed circuit board which is mounted with the wireless communication unit and includes a ground area; a power feeding pad which is connected with a signal transmitting/receiving terminal of the wireless communication unit, contacted with a side of the PIFA type antenna when the PIFA type antenna is equipped in the electronic device, and positioned on the printed circuit board; and a connection section which forms an electric route between the ground area and the power feeding pad.

In order to solve the above-described problems or inconveniences, there is provided a wireless signal transmitting/receiving device of an electronic device. The wireless transmitting/receiving device may include: a PIFA (Planar Inverted-F Antenna) type antenna which is transmitting or receiving a wireless signal; a wireless communication unit which is connected with a side of the PIFA type antenna, and processing the transmitted or received wireless signal; a printed circuit board which is mounted with the wireless communication unit and includes a ground area; and a connection section which electrically connects a route between the PIFA type antenna and the wireless communication unit with the ground area of the printed circuit board.

Advantageous Effects of Invention

As described above, according to the exemplary embodiments of the present disclosure, an electronic device with a PIFA type antenna and a wireless signal transmitting/receiving device thereof are capable of improving a radiation efficiency and performance of the electronic device without increasing an effective volume of the PIFA type antenna.

BRIEF DESCRIPTION OF DRAWINGS

The objects, features and advantages of the present disclosure will become more apparent to a person of ordinary skill in the art from the following detailed description in conjunction with the accompanying drawings, in which:

FIG. 1 is a block diagram illustrating an electronic device according to an exemplary embodiment of the present disclosure;

FIG. 2 is a block diagram illustrating an electronic device with a PIFA type antenna according to another exemplary embodiment of the present disclosure;

FIG. 3 is a view illustrating a PIFA type antenna according to an exemplary embodiment of the present disclosure and a printed circuit board on which the PIFA type antenna is mounted;

FIG. 4 is a view illustrating a PIFA type antenna according to another exemplary embodiment of the present disclosure and a printed circuit board on which the PIFA type antenna is mounted;

FIG. 5 is a view illustrating a PIFA type antenna according to still another exemplary embodiment of the present disclosure, a printed circuit board on which the PIFA type antenna is mounted, and a case;

FIG. 6 is a view illustrating a PIFA type antenna according to yet another exemplary embodiment of the present disclosure, a printed circuit board on which the PIFA type antenna is mounted, and a case; and FIG. 7 is a graph representing measured radiation performances of a conventional electronic device and an electronic device according to an exemplary embodiment of the present disclosure.

MODE FOR THE INVENTION

Hereinafter, various exemplary embodiments will be described in detail with reference to the accompanying drawings. It should be noted that the same elements will be designated by the same reference numerals although they are shown in different drawings. Further, detailed descriptions related to well-known functions or configurations capable of making subject matters of the present invention unnecessarily obscure will be omitted. In the following description, it should be noted that only portions required for comprehension of operations according to the embodiments of the present invention will be described and descriptions of other portions will be omitted not to make subject matters of the present invention obscure. Also, in the accompanying drawings, some elements are exaggerated, omitted, or schematically illustrated, and the size of each element does not entirely reflect an actual size.

Meanwhile, the various exemplary embodiments of the present invention disclosed in the present specification and the drawings have been presented to easily explain contents of the present invention and help comprehension of the present invention, and do not limit the scope of the present invention. Therefore, it should be construed that all modifications or modified forms drawn by the technical idea of the present invention in addition to the embodiments disclosed herein are included in the scope of the present invention.

Before providing a detailed description, it is premised that an electronic device according to an exemplary embodiment of the present disclosure to be described later may be any of various electronic devices with a PIFA type antenna such as a mobile communication device, a Personal Digital Assistants (PDA), a smart phone, a tablet Personal Computer (PC), and a Portable Multimedia Player (PMP).

FIG. 1 is a block diagram illustrating an electronic device according to an exemplary embodiment of the present disclosure.

Referring to FIG. 1, an electronic device 100 according to an exemplary embodiment of the present disclosure may include a PIFA type antenna 10, a control unit 110, a power feeding pad 120, a ground pad 130, a connection section 140, a wireless communication unit 150, and a ground area 160.

The PIFA type antenna 10 may include a radiation section 11, a power feeding section 12, and a ground section 13.

The radiation section 11 may transmit/receive a wireless signal having a designed frequency. For example, the radiation section 11 may radiate a wireless signal transmitted from the wireless communication unit 150 through the power feeding pad 120 and the power feeding section 12, to the outside, or receive a wireless signal and transmit the received wireless signal to the wireless communication unit 150 through the power feeding section 12 and the power feeding pad 120.

The power feeding section 12 may come into contact with the power feeding pad 120 when the PIFA type antenna 10 is equipped (mounted and fastened) in the electronic device 100. The power feeding section 12 may send a signal received from the power feeding pad 120 to the radiation section 11, or send a signal received from the radiation section 11 to the wireless communication unit 150 through the power feeding pad 120.

The ground section 13 may come into contact with the ground pad 130 when the PIFA type antenna 10 is equipped (mounted and fastened) in the electronic device 100.

The power feeding pad 120 may be positioned between the power feeding section 12 and the wireless communication unit 150. For example, the power feeding pad 120 may be electrically connected with the wireless communication unit 150 (e.g., a signal transmitting/receiving terminal) and the ground pad 130. In addition, the power feeding pad 120 may be connected with the power feeding section 12 of the antenna 10 when the antenna 10 is equipped in the electronic device 100.

The ground pad 130 may be connected with the ground section 13 of the antenna 10 when the antenna 10 is equipped in the electronic device 100. The ground pad 130 may be electrically connected with the ground area 160. In addition, the ground pad 130 may be electrically connected with the power feeding pad 120 through the connection section 140.

The connection section 140 may form an electric route between the power feeding pad 120 and the ground pad 130. For example, the connection section 140 may electrically connect the power feeding pad 120 to at least one of the ground pad 130 and the ground area 160.

The ground area 160 may serves as a ground of the electronic device 100. For example, the ground area 160 may serves as a reference voltage point in the electronic device 100. The ground area 160 may be formed by a conductive (e.g., metal) layer on a Printed Circuit Board (PCB).

The wireless communication unit 150 may support a wireless communication function of the electronic device 100. The wireless communication unit 150 may include, for example, a mobile communication module that supports a mobile communication (e.g., 3G or 4G standard mobile communication) function and a short range wireless communication module that supports a short range wireless communication function.

The control unit 110 may control overall operations of the electronic device 100 and a signal flow between internal blocks of the electronic device 100, and perform a data processing function that processes data. For example, the control unit 110 may be formed by, for example, a Central Processing Unit (CPU), and an Application Processor (AP). The control unit 110 may be formed by a single core processor or a multi-core processor.

Meanwhile, the electronic device 100 may further include a first elastic member (not illustrated) so as to ensure stable contact between the power feeding section 12 and the power feeding pad 120 and a second elastic member (not illustrated) so as to ensure stable contact between the ground section 13 and the ground pad 130. The first elastic member (not illustrated) and the second elastic member (not illustrated) may be a C-clip.

In addition, although the ground pad 130 and the ground area 160 are directly connected with each other in the illustrated electronic device 100, an exemplary embodiment of the present disclosure is not limited thereto. For example, a matching unit may be interposed between the ground pad 130 and the ground area 160. The matching unit may be configured by one or more lumped elements which are connected in serial and/or parallel. The lumped elements may be, for example, a resistor, an inductor, and a capacitor.

When a plurality of matching units are provided, the electronic device 100 may further include a switching unit which performs switching such that any one of the plurality of matching units is connected with the ground pad 130 and the ground area 160 under the control of the control unit 110. Similarly, the electronic device 100 may further include a matching unit (not illustrated) between the power feeding section 120 and the wireless communication unit 150.

In addition, the electronic device 100 may selectively further include components having additional functions such as a broadcasting receiving module for receiving broadcasting, a sensor module including a plurality of sensors (e.g., a motion sensor, an illuminance sensor, an acceleration sensor, and a geomagnetic sensor), a camera module that supports a still image or moving image photographing function, a digital music reproducing module such as an MP3 module, and a voice recognition module that supports a voice recognition function. It is difficult to enumerate all such components since they may be variously modified according to a tendency of convergence of digital devices. However, the electronic device 100 according to the present exemplary embodiment may further include any components equivalent to the above-mentioned components.

FIG. 2 is a block diagram illustrating an electronic device with a PIFA type antenna according to another exemplary embodiment of the present disclosure.

Referring to FIG. 2, an electronic device 200 according to another exemplary embodiment of the present disclosure may include a PIFA type antenna 20, a control unit 210, a power feeding pad 220, a ground pad 230, a connection section 240, a wireless communication unit 250, and a ground area 260. The PIFA type antenna 20 may include a radiation section 21, a power feeding section 22, and a ground section 23.

The electronic device 200 according to the present exemplary embodiment is different from the electronic device 100 illustrated in FIG. 1 only in the configuration of the connection sections 140 and 240. Thus, descriptions for the other same components will be omitted.

The connection section 240 may include one or more lumped elements. The one or more lumped elements may be connected in serial and/or parallel. For example, the connection section 240 may include a resistor 241 and an inductor 242 which are connected with each other in serial. The kinds, values and circuit structure of the lumped elements may be optimized through a test.

FIG. 3 is a view illustrating a PIFA type antenna according to an exemplary embodiment of the present disclosure and a printed circuit board on which the PIFA type antenna is mounted.

Referring to FIG. 3, a printed circuit board 1000 of the electronic device 100 of the present exemplary embodiment may be mounted with one or more electronic elements. For example, a control unit 110, a power feeding pad 120, a ground pad 130, a connection section 140, and a wireless communication unit 150 may be mounted on the printed circuit board 1000. In addition, the printed circuit board 1000 may further include wiring to electrically connect the electronic elements, and a ground area 160.

According to an exemplary embodiment of the present disclosure, the connection section 140 may be formed by a conductive (e.g. metal) line, and may connect a first route (or wiring) that connects the power feeding pad 120 and the wireless communication unit 150 and a second route (or wiring) that connects the ground pad 130 and the ground area 150. For example, a length, a width, a position, and a shape of the connection section 140 may be variously changed so as to optimize the radiation performance of the PIFA type antenna 10.

Meanwhile, FIG. 3 illustrates that the connection section 140 connects the first route (or wiring) which connects the power feeding pad 120 and the wireless communication unit 150 and the second route (or wiring) which connects the ground pad 130 and the ground area 150. However, the connection section 140 may connect the first route to the ground area 160 without connecting with the second route. In addition, the connection section 140 may connect the first route to both the second route and the ground area 160.

The power feeding pad 120, the ground pad 130, and the connection section 140 may be formed in a fill-cut region 1010 of the printed circuit board 1000 which is formed by completely removing a conductive (e.g. metal) layer.

The antenna 10 may be mounted on a carrier 14. The shape of the antenna 10 illustrated in FIG. 3 is merely an example and the present disclosure is not limited thereto. For example, the length, the width and the shape of the radiation section 11 may be variously formed. In addition, the positions of the power feeding section 12 and the ground section 13 may be changed. In other words, the power feeding section 12 may be positioned at the right side and the ground section 13 may be positioned at the left side, unlike FIG. 3.

FIG. 4 is a view illustrating a PIFA type antenna according to another exemplary embodiment of the present disclosure and a printed circuit board on which the PIFA type antenna is mounted.

Referring to FIG. 4, a printed circuit board 2000 of an electronic device 200 according to another exemplary embodiment of the present disclosure may be mounted with a control unit 210, a power feeding pad 220, a ground pad 230, a connection section 240, and a wireless communication unit 250. In addition, the printed circuit board 2000 may include wiring to electrically connect electronic elements, and a ground area 260.

The connection section 240 of the electronic device 200 according to another exemplary embodiment of the present disclosure may include one or more lumped elements. For example, FIG. 4 illustrates two lumped elements 241 and 242 are connected in serial. This is merely an example and exemplary embodiments of the present disclosure are not limited thereto as described above. Meanwhile, in order to avoid overlapped descriptions with FIG. 3, descriptions on other components will be omitted.

FIG. 5 is a view illustrating a PIFA type antenna according to still another exemplary embodiment of the present disclosure, a printed circuit board on which the PIFA type antenna is mounted, and a case.

Referring to FIG. 5, an electronic device according to still another exemplary embodiment includes a ground pad 330 which may be provided on a case (3100) of the electronic device (e.g., a front case or a rear case) rather than a printed circuit board 3000.

When a case 3100 includes a ground pad 330, at least a part of the case 3100 (hereinafter, referred to as a "conductive area") may be formed of a conductive material (e.g. metal). Alternatively, the conductive area may be formed by painting, coating or depositing (evaporating) a conductive material on at least a part of the case 3100.

The conductive area of the case 3100 may electrically connected with a ground area 360 of the printed circuit board 3000 through at least one hole 361. A screw may be fastened to the at least one hole 361. When the ground pad 330 is positioned in the conductive area of the case 3100 as described above, the ground section 33 may be connected with the ground area 360 through the ground pad 330 and the conductive area of the case 3100.

In the foregoing, although an example, in which the ground pad 330 is mounted on the case 3100, has been described, exemplary embodiments of the present disclosure are not limited thereto. For example, a power feeding pad 320 may positioned on the case 3100. Meanwhile, in order to avoid overlapped descriptions, descriptions on the other components will be omitted.

FIG. 6 is a view illustrating a PIFA type antenna according to yet another exemplary embodiment of the present disclosure, a printed circuit board on which the PIFA type antenna is mounted, and a case.

Referring to FIG. 6 a control unit 410, a power feeding pad 420, a connection section 440, and a wireless communication unit 450 may be mounted on a printed circuit board 4000 of an electronic device according to yet another of the present disclosure. In addition, the printed circuit board 4000 may include wiring to electrically connect electronic elements, and a ground area 460. Thus, the printed circuit board of yet another exemplary embodiment of the present disclosure does not include a ground pad.

According to yet another exemplary embodiment of the present disclosure, a PIFA type antenna may formed by a single pad 42 (hereinafter, referred to as an "integrated pad") unlike the PIFA type antennas of FIGS. 3 and 4. The integrated pad 42 of the PIFA type antenna may be come in contact with the power feeding pad 420 of the printed circuit board 4000 when the PIFA type antenna is equipped in the electronic device. In addition, although FIG. 6 illustrates the connection section 440 as being formed by a conductive line, the connection section 440 may include one or more lumped elements which are connected in serial and/or parallel as illustrated in FIG. 4. Meanwhile, in order to avoid overlapped descriptions, descriptions on other components will be omitted.

FIG. 7 is a graph representing measured radiation performances of a conventional electronic device and an electronic device according to an exemplary embodiment of the present disclosure.

Referring to FIG. 7, the first graph 501 is a radiation performance graph of a conventional electronic device, and the second graph 502 is a radiation performance graph of an electronic device according to an exemplary embodiment. Meanwhile, the second graph 502 of FIG. 7 and measured results of Table 2 below were obtained by performing a measurement using the electronic device illustrated in FIG. 6.

The radiation performances of the conventional electronic device and the electronic device according to the exemplary embodiment of the present disclosure were measured using a Standing Wave Ratio (SWR). Here, the SWR refers to an indicator indicating a degree of reflection of energy input to or output from a circuit or a system, and may be represented by a ratio of a minimum value and a maximum value of a standing wave at an input stage or an output stage as in Equation 1 below. Here, the standing wave refers to a stationary wave generated when a progress wave is combined with a wave reflected with reference to a boundary surface.

$$SWR = (1+\text{reflection coefficient})/(1-\text{reflection coefficient}) \quad \text{(Equation 1)}$$

Referring to Equation 1, there is no reflection at an input or output stage, the SWR becomes 1 which is the best value, and when the reflection is very high, the SWR may become infinite. That is, Equation 1 means that the radiation performance is better when the SWR is nearer to 1.

Meanwhile, upon comparing the first graph 1 501 and the second graph 502 of FIG. 7, it can be seen that the SWR of the electronic device of the exemplary embodiment of the present disclosure is better than that of the conventional electronic device in a band of about 830 MHz to 900 MHz and a band of about 2,100 MHz to 2,800 MHz.

In addition, Table 1 below represents a radiation efficiency of the conventional electronic device, and Table 2 illustrates a radiation efficiency of the electronic device of the exemplary embodiment of the present disclosure.

TABLE 1

|  | 1 | 2 | 3 | 4 | 5 | 6 | 7 | 8 | 9 | 10 | 11 |
|---|---|---|---|---|---|---|---|---|---|---|---|
| Frequency [MHz] | 791 | 821 | 832 | 862 | 880 | 915 | 925 | 960 | 1710 | 1785 | 1805 |
| Efficiency [dB] | −11.34 | −9.43 | −8.99 | −7.88 | −7.60 | −7.17 | −7.09 | −7.85 | −3.82 | −2.85 | −2.57 |
| Efficiency [%] | 7.35 | 11.39 | 12.63 | 16.28 | 17.38 | 19.17 | 19.54 | 16.42 | 41.48 | 51.88 | 55.37 |
| TRG [dB] | −11.34 | −9.43 | −8.99 | −7.88 | −7.60 | −7.17 | −7.09 | −7.85 | −3.82 | −2.85 | −2.57 |

|  | 12 | 13 | 14 | 15 | 16 | 17 | 18 | 19 | 20 |
|---|---|---|---|---|---|---|---|---|---|
| Frequency [MHz] | 1880 | 1920 | 1980 | 2110 | 2170 | 2500 | 2570 | 2620 | 2690 |
| Efficiency [dB] | −2.47 | −3.00 | −1.91 | −3.22 | −2.39 | −7.02 | −6.89 | −7.97 | −8.92 |
| Efficiency [%] | 56.62 | 50.10 | 64.41 | 47.64 | 57.67 | 19.84 | 20.49 | 15.94 | 12.83 |
| TRG [dB] | −2.47 | −3.00 | −1.91 | −3.22 | −2.39 | −7.02 | −6.89 | −7.97 | −8.92 |

TABLE 2

|  | 1 | 2 | 3 | 4 | 5 | 6 | 7 | 8 | 9 | 10 | 11 |
|---|---|---|---|---|---|---|---|---|---|---|---|
| Frequency [MHz] | 791 | 821 | 832 | 862 | 880 | 915 | 925 | 960 | 1710 | 1785 | 1805 |
| Efficiency [dB] | −11.59 | −9.44 | −8.88 | −7.61 | −7.34 | −7.31 | −7.47 | −9.05 | −3.92 | −3.13 | −2.81 |

TABLE 2-continued

| Efficiency [%] | 6.93 | 11.37 | 12.94 | 17.34 | 18.44 | 18.58 | 17.90 | 12.43 | 40.52 | 48.67 | 52.34 |
|---|---|---|---|---|---|---|---|---|---|---|---|
| TRG [dB] | −11.59 | −9.44 | −8.88 | −7.61 | −7.34 | −7.31 | −7.47 | −9.05 | −3.92 | −3.13 | −2.81 |

| | 12 | 13 | 14 | 15 | 16 | 17 | 18 | 19 | 20 |
|---|---|---|---|---|---|---|---|---|---|
| Frequency [MHz] | 1880 | 1920 | 1980 | 2110 | 2170 | 2500 | 2570 | 2620 | 2690 |
| Efficiency [dB] | −2.80 | −3.49 | −2.19 | −3.31 | −2.22 | −4.43 | −6.38 | −7.37 | −7.23 |
| Efficiency [%] | 52.45 | 44.72 | 60.42 | 46.68 | 59.96 | 36.04 | 23.03 | 18.31 | 18.90 |
| TRG [dB] | −2.80 | −3.49 | −2.19 | −3.31 | −2.22 | −4.43 | −6.38 | −7.37 | −7.23 |

Upon comparing Table 1 and Table 2, it can be found that the radiation efficiency of the electronic device is improved at 862 MHz, 880 MHz, 2500 MHZ, 2570 MHz, 2620 MHz, and 2690 MHz.

As described in detail above, various exemplary embodiments of the present disclosure are capable of improving a radiation performance and efficiency of an PIFA type antenna without increasing an effective volume of the antenna. As a result, the various exemplary embodiments of the present disclosure may easily secure a radiation performance and efficiency in a slimmed electronic device.

In the foregoing, electronic devices including PIFA type antennas according to various exemplary embodiments of the present disclosure and wireless signal transmitting/receiving devices thereof have been described with reference to the accompanying drawings and specific terms have been used. However, the drawings and terms have been used in a general sense merely for easily describing various exemplary embodiments of the present disclosure and for helping understanding thereof and the present disclosure is not limited to the above-described exemplary embodiments. That is, it is obvious to those skilled in the art to which the present invention belongs that various embodiments can be implemented based on the technical idea of the present invention.

The invention claimed is:

1. An electronic device comprising:
   a planar inverted-F antenna (PIFA) type antenna configured to transmit or receive a wireless signal;
   a wireless communication unit configured to process the transmitted or received wireless signal;
   a printed circuit board which is mounted with the wireless communication unit and includes a ground area;
   a power feeding pad which is electrically connected with a signal transmitting/receiving terminal of the wireless communication unit, and connected with a power feeding section of the PIFA type antenna when the PIFA type antenna is equipped in the electronic device;
   a ground pad which is electrically connected with the ground area, and connected with a ground section of the PIFA type antenna when the PIFA type antenna is equipped in the electronic device; and
   a connection section configured to electrically connect a first point between the power feeding pad and the wireless communication unit to a second point between the ground pad and the ground area such that the connection section forms an electric route between the power feeding pad and the ground pad.

2. The electronic device as claimed in claim 1, wherein the connection section is formed by a conductive line which electrically connects the power feeding pad with at least one of the ground area and the ground pad.

3. The electronic device as claimed in claim 2, wherein the connection section includes one or more lumped elements which are connected in at least one of serial and parallel.

4. The electronic device as claimed in claim 1, wherein the power feeding pad is positioned on the printed circuit board, and the ground pad is positioned on a case of the electronic device, and
   wherein the connection section connects the power feeding pad with the ground area of the printed circuit board, and the ground area of the printed circuit board is electrically connected with the ground pad through a conductive area of the case of the electronic device.

5. An electronic device comprising:
   a planar inverted-F antenna (PIFA) type antenna configured to transmit or receive a wireless signal;
   a wireless communication unit configured to process the transmitted or received wireless signal;
   a printed circuit board which is mounted with the wireless communication unit and includes a ground area;
   a power feeding pad which is connected with a signal transmitting/receiving terminal of the wireless communication unit, contacted with a side of the PIFA type antenna when the PIFA type antenna is equipped in the electronic device, and positioned on the printed circuit board; and
   a connection section configured to electrically connect a first point between the power feeding pad and the wireless communication unit to a second point between the ground pad and the ground area such that the connection section forms an electric route between the ground area and the power feeding pad.

6. The electronic device as claimed in claim 5, wherein the connection section includes one or more lumped elements connected in at least one of serial and parallel.

7. A wireless signal transmitting/receiving apparatus of an electronic device, the wireless transmitting/receiving apparatus comprising:
   a planar inverted-F antenna (PIFA) type antenna configured to transmit or receive a wireless signal;
   a wireless communication unit which is connected with a side of the PIFA type antenna, and is configured to process the transmitted or received wireless signal;
   a printed circuit board which is mounted with the wireless communication unit and includes a ground area; and
   a connection section configured to electrically connect a first point between the power feeding pad and the wireless communication unit to a second point between the ground pad and the ground area such that the connection section electrically connects a route between the PIFA type antenna and the wireless communication unit with the ground area of the printed circuit board.

8. The wireless signal transmitting/receiving device as claimed in claim 7, wherein the PIFA type antenna comprises:
   a power feeding section which is connected with the wireless communication unit; and
   a ground section which is connected with the connection section.

9. The wireless signal transmitting/receiving device as claimed in claim 7, further comprising:
   a case which comprises a conductive area, the conductive area connected with the ground area of the printed circuit board.

10. The wireless signal transmitting/receiving device as claimed in claim 9, wherein the PIFA type antenna comprises:
   a power feeding section which is connected with the wireless communication unit; and
   a ground section which is connected with the conductive area of the case.

11. The wireless signal transmitting/receiving device as claimed in claim 7, wherein the connection section includes one or more lumped elements which are connected in serial and/or parallel.

12. The wireless signal transmitting/receiving device as claimed in claim 7, wherein the connection section is formed by a conductive line having a length, a width, a position, and a shape according to optimization of a performance of the PIFA type antenna.

* * * * *